No. 666,887. Patented Jan. 29, 1901.
J. I. ROW.
AIR VALVE.
(Application filed Sept. 19, 1900.)
(No Model.)
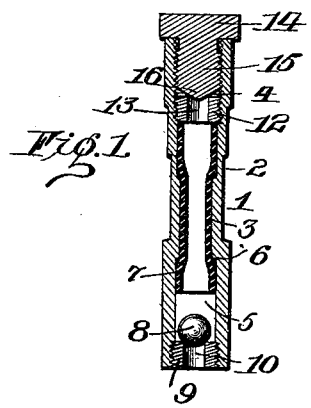
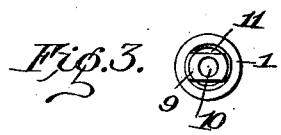
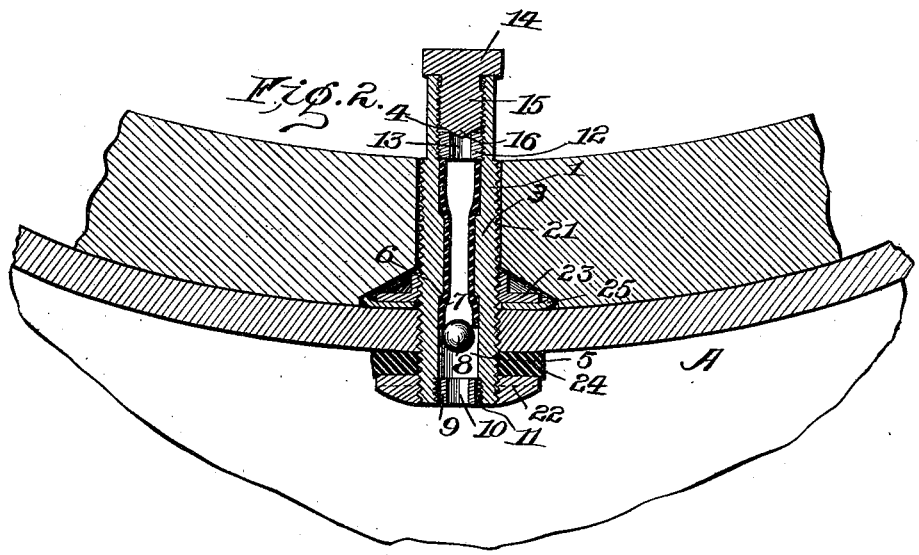
Witnesses:
Walter B. Payne
G. Willard Rich
Inventor,
John I. Row
by Church & Church
his Attorneys.

UNITED STATES PATENT OFFICE.

JOHN I. ROW, OF ROCHESTER, NEW YORK, ASSIGNOR OF ONE-HALF TO HENRY G. COOK, OF SAME PLACE.

AIR-VALVE.

SPECIFICATION forming part of Letters Patent No. 666,887, dated January 29, 1901.

Application filed September 19, 1900. Serial No. 30,474. (No model.)

*To all whom it may concern:*

Be it known that I, JOHN I. ROW, of the city of Rochester, in the county of Monroe and State of New York, have invented certain new and useful Improvements in Air-Valves; and I do hereby declare the following to be a full, clear, and exact description of the same, reference being had to the accompanying drawings, forming a part of this specification, and to the reference characters marked thereon.

My present invention has for its object to provide an improved air-valve adapted particularly to be used upon inflated or pneumatic tires for bicycles or other vehicles, in which the parts are easily constructed and adapted to permit a free passage of air into the tire and afford an effectual check against its outward passage therefrom.

In the drawings, Figure 1 is a longitudinal sectional view through a valve constructed in accordance with my invention. Fig. 2 is a similar view of a valve, showing its method of attachment to a tire; and Fig. 3 is a bottom plan view of the valve shown in Fig. 1.

Similar reference characters in the several figures indicate similar parts.

Valves constructed in accordance with my invention embody an outer tubular casing or valve-body 1, adapted to be inserted in the usual tubular valve-stem of a bicycle-tire, and intermediate its extremities are provided annular notches or depressions 2 to assist in securing the device in place when the customary winding of wire or thread is applied around the stem. The interior of the valve body or casing 1 is formed with a central portion or base 3 and the opposite ends of the body being somewhat larger in diameter than the former, making the chambers 4 and 5 at the upper and lower ends of the body, respectively, and forming upon each end of the central portion 3 the shoulder 6. Arranged within the former and projecting beyond the shoulder is a piece of small elastic rubber tubing 7, which is inserted by stretching the latter, drawing it through the restricted portion of the casing, and then cutting it the required length, allowing the ends to retract to the position shown, the outer circumference of the tube fitting closely against the inside of the casing. Located in the chamber 5 is a ball 8, movable freely therein and adapted to coöperate with the end of the rubber tube and form a seat thereon to prevent the outward escape of air. A small nut 9, having an aperture 10 in its center, is threaded into the lower end of the chamber and confines the ball therein, and to prevent the valve from being closed against the inward passage of air during the operation of inflating the tire by the ball engaging the upper edge of the aperture I provide by-passages 11 by flattening the sides of the nut 9, as shown in Fig. 3. In the chamber 4, at the upper end of the casing, is also provided a nut 12, inserted to protect the upper end of the tube 7 and provided with the central aperture 13. A cap 14, having the threaded stem 15, is adapted to be secured into the chamber 4 to close the casing, and as an additional closure for the valve I form a conical tip 16 upon the stem intended as the latter is inserted to engage the upper edge of the aperture in the nut 12. This seat being small in area and the parts composed of a soft metal, such as brass, they may be secured together with sufficient force to prevent any leakage of air between them, and the omission of packing or washers removes the liability of the cap sticking, making it difficult to remove, or of the washers or packing becoming worn or frayed, so as to obstruct the passage in the valve.

In Fig. 2 I have shown a form of my valve adapted to be used in lieu of the usual tubular stem on the tire and in which the valve-casing is intended to be attached directly to the tire, (indicated by A,) a suitable aperture having been provided upon the inner circumference for the insertion of the valve-casing. In this arrangement of the device the casing 1 is provided with an exterior thread 21, extending upward from its lower end, as shown, and upon which are secured the nuts 22 and 23, adapted to be clamped upon the inner and outer sides, respectively, of the tire A, a suitable packing-washer 24 being located between the inner side of the tire and the nut 22 and a thin metallic washer 25 being provided between the tire and the nut 23. In applying this form of the valve to a tire the nut 22 may be secured upon the lower end of the casing with the packing-washer 24 above it, when both these parts may be inserted through the aperture in the tire. A small quantity of liquid-rubber cement may then be injected between the parts and the washer 25 and nut 23 applied upon the exterior, the latter being screwed down to securely engage and slightly compress the portion of the tire surrounding the valve-stem, making an air-tight joint or connection between the latter and the side of the tire.

To inflate a tire provided with my valve, the cap 15 is first removed, permitting the pump-nozzle to be applied, when air may be forced into the tire. Unless the tire is entirely empty the ball 8 will be held by the outward pressure of air in the tire against the seat upon the lower end of the rubber tube 7 and upon each inward rush of air will be dislodged to permit its passage, as will be readily understood. When it is desired to deflate the tire, the ball 8 may be held from engagement with its seat by means of a small pin, match, or similar instrument.

Valves constructed in accordance with my invention are simple, and, consisting of few parts, may be easily manufactured and are adapted to be used upon any form of inflatable devices. The restricted passage between the chambers upon the opposite ends of the valve-casing forming the shoulders at their ends over which the ends of the rubber tube are expanded serves to securely engage the latter and prevent any possible escape of air between the tube and the sides of the casing, and by allowing a free movement of the ball in the chamber the air can always be easily applied or released.

I claim as my invention—

1. In a valve, the combination with the casing having a smaller and a larger diameter, the entrance to the former constituting an annular shoulder, and an elastic tube arranged in the smaller diameter and having its end extending into the larger diameter, of a ball larger than the smaller diameter of the casing, operating in the larger diameter and adapted to extend within the tube to expand the latter over the shoulder and the nut having the passage and screwing into the larger diameter of the casing to hold the ball.

2. In a valve the combination with a tubular casing having the chamber at its inner end, and the restricted passage extending above the latter, of an elastic tube frictionally engaging the sides of said passage securing the tube therein having its inner end forming an annular shoulder in the outer end of the chamber, a ball movable freely in the chamber adapted to be held against the shoulder by air-pressure and forming a seat thereon and closing the valve, and a nut provided with the aperture and having the flattened sides forming air-passages, screwed into the chamber to prevent the removal of the ball.

3. In a valve the combination with a tubular valve-casing having chambers at its upper and lower ends, the restricted passage between them, and an elastic tube located in the latter having its ends projecting into the chambers and forming shoulders therein, of the ball freely movable in the chamber upon the lower end of the valve, means for retaining the ball in the chamber, and a nut having the air-passage threaded into the chamber above the tube and a closure for said casing.

4. In a valve the combination with a tubular casing provided with the chambers at its opposite ends and having a restricted passage extending between them forming the shoulders at the ends of the chambers, and a piece of elastic tubing located in said passage, having its ends projecting beyond the shoulders and expanding against the sides of the chambers forming annular elastic shoulders therein, of a ball arranged in the chamber upon the lower end of the valve-casing, means for retaining it in the chamber, a nut having the central aperture secured in the chamber above the tube and a cap or closure for said casing having the stem provided with the conical end adapted to engage the edge of the aperture in the nut.

5. In a valve the combination with the tubular casing having a passage and an enlarged chamber at the bottom thereof, of an elastic tube arranged in the passage having its end extending into the enlarged chamber and a movable valve arranged in the chamber and coöperating with the lower end of the elastic tube.

6. In a valve the combination with the tubular casing having a smaller and a larger internal diameter the latter forming a chamber, of an elastic tube located in the smaller portion of the casing and extending into the larger diameter or chamber and normally or when expanded larger than the smaller diameter thereof, and a ball-valve arranged in the chamber and adapted to coöperate with the end of the tube.

JOHN I. ROW.

Witnesses:
G. WILLARD RICH,
WALTER B. PAYNE.